United States Patent [19]

Chapman

[11] 3,781,590

[45] Dec. 25, 1973

[54] PINCUSHION DISTORTION CORRECTION CIRCUIT

[75] Inventor: Steven J. Chapman, Wilmette, Ill.

[73] Assignee: Warwick Electronics, Inc., Chicago, Ill.

[22] Filed: June 12, 1972

[21] Appl. No.: 261,947

[52] U.S. Cl. .......................... 315/27 SR, 315/276 D

[51] Int. Cl. .............................................. H01j 29/70

[58] Field of Search .................... 315/276 D, 27 SR, 315/27 R, 28, 29

[56] References Cited

UNITED STATES PATENTS

| | | | |
|---|---|---|---|
| 3,452,243 | 6/1969 | Knorr, Jr. | 315/276 D |
| 3,329,862 | 7/1967 | Lemke | 315/27 SR |
| 3,329,861 | 7/1967 | Barkow et al. | 315/27 SR |

*Primary Examiner*—Carl D. Quarforth
*Assistant Examiner*—J. M. Potenza
*Attorney*—James S. Nettleton et al.

[57] ABSTRACT

A saturable reactor in series with a horizontal deflection coil introduces a parabolic reactance variation which corrects for side pincushion distortion in a television cathode ray tube. A bridge rectifier circuit rectifies a sawtooth output from a vertical deflection circuit to produce a triangular waveform which is applied to one control winding of the saturable reactor. A remaining control winding is coupled to a DC bias source.

9 Claims, 2 Drawing Figures

PINCUSHION DISTORTION CORRECTION CIRCUIT

BACKGROUND OF THE INVENTION

This invention relates to a circuit for correcting pincushion raster distortion in a cathode ray tube.

Pincushion raster distortion can be corrected by using a saturable reactor to generate a variable reactance having a parabolic shape. In some prior circuits, the saturable reactor has been placed in series with a horizontal deflection coil, and operated in its nonlinear region under control of signals derived from the vertical deflection circuitry.

Typically, the derived control signal requires the vertical deflection circuitry to be modified so as to produce a parabolic current or voltage. Depending on the television receiver, this may require additional stages of amplification, or additional circuitry to produce the desired wave shape.

SUMMARY OF THE INVENTION

The present invention eliminates the necessity of a parabolic signal source for controlling a saturable reactor in a pincushion correction circuit. This is accomplished by rectifying the conventional sawtooth output of a first deflection circuit so as to produce a double-triangular current waveform which is applied to a first winding on the saturable reactor. A second winding on the saturable reactor is connected in series between the output of a second deflection circuit and its respective deflection winding. This second coil on the saturable reactor serves as a variable impedance element which effects the desired modulation of the current from the second deflection circuit for correcting pincushion distortion. Means are also provided for biasing the saturable reactor such that it operates on a nonlinear portion of its BH characteristic. Thus, a triangular current waveform flowing through the first winding, or control winding, of the saturable reactor effects a nonlinear variation in the impedance of the second winding, alternately called the impedance winding, of the saturable reactor such that essentially parabolic modulation is applied to the current flowing through the impedance winding.

It should be appreciated that this technique may be utilized for correcting pincushion distortion at either the sides of the raster or at the top and bottom of the raster. Due to the impedance characteristics of the deflection windings presently used in television receivers, the invention is best employed for correcting side pincushion distortion. The circuitry required to accomplish the correction is much simpler than prior circuits since it requires no special parabolic voltage or current supplies, but rather, operates directly from waveforms present in substantially all television receivers. As a result, the circuit can be used with a wide variety of deflection circuits, without modification thereto.

In the preferred embodiment, a bridge rectifier is provided for rectifying the output of a vertical deflection circuit to produce the double triangular current waveform which is applied to the control winding of the saturable reactor. A variable impedance is provided which shunts the bridge and permits adjustment of the amount of current being supplied to the control winding of the saturable reactor. The leg of the bridge through which the leading portion of the scan current passes also contains a lead network for correcting distortion which would otherwise be introduced into the vertical scan waveform as a result of the inductance of the control winding on the saturable reactor. A two window saturable reactor is employed, having a portion of the control winding and a bias winding wound about the outer core legs and the impedance winding wound about the inner core leg. The impedance winding is connected in series between the horizontal output circuit and the horizontal deflection winding.

One object of the invention is the provision of an improved pincushion correction circuit utilizing a saturable reactor to produce nonlinear impedance variations in a coil wound thereon as a function of a substantially linear control current waveform.

Another object of the invention is the provision of a pincushion correction circuit which provides a large range of correction suitable for use with 110° deflection systems.

A further object of the invention is the provision of a pincushion correction circuit which is simple in principal and involves no resonance phenomenon, so as to render component values non-critical and eliminate phase shift problems which generally exist in circuits utilizing resonance phenomenon.

A still further object of the invention is the provision of a pincushion correction circuit which is efficient and requires no signal processing amplifiers.

Other objects and features of the invention will be apparent from the following description and drawings. While an illustrative embodiment of the invention is shown in the drawings and will be described in detail herein, the invention is susceptible of embodiment in many different forms and it should be understood that the present disclosure is to be considered as an exemplification of the principles of the invention and is not intended to limit the invention to the embodiment illustrated.

DESCRIPTION OF THE PREFERRED EMBODIMENT

Figures 1, 2:
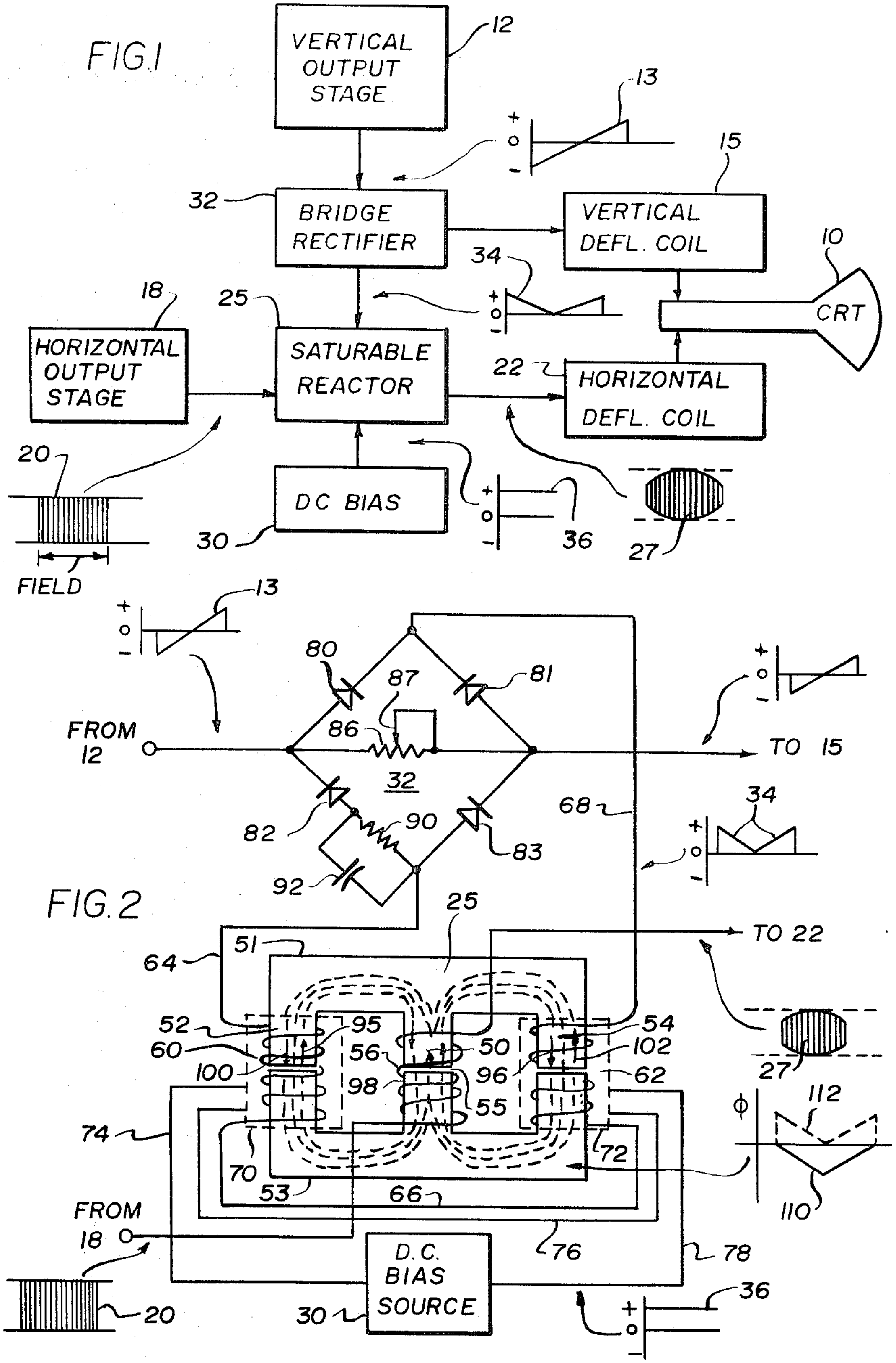
FIG. 1 is a block diagram of a novel circuit for correcting pincushion raster distortion in a cathode ray tube of a television receiver.
FIG. 2 is a schematic diagram showing the circuit of FIG. 1 in detail.

FIG. 1 illustrates a circuit for correcting pincushion raster distortion in a cathode ray tube (CRT) 10 of a television receiver. A vertical output stage 12 generates a vertical scan signal 13 which is coupled to a vertical deflection coil 15 for controlling the vertical scan of the CRT 10 in a known manner. In order to control the horizontal scan, a horizontal output stage 18 generates a horizontal scan signal 20 which is coupled through the applicant's correction circuit to a horizontal deflection coil 22 which controls the horizontal scan of the CRT 10.

To correct for side pincushion distortion, it is necessary to increase the amplitude of the horizontal scan signals progressively as the electron beam approaches the middle of the vertical raster, and then progressively decreases the amplitude of the horizontal scan signals as the beam approaches the lower portion of the vertical scan. The correction circuit includes a variable reactance device, such as a saturable core reactor 25, in series between the horizontal output stage 18 and the horizontal deflection coil 22. The reactor 25 is controlled in a manner to cause the horizontal scan signals 20 to assume a corrected form 27 having a parabolic envelope which corrects in a known manner for side pincushion distortion. It will be appreciated that the uncorrected horizontal scan signals 20, and the corrected horizontal scan signals 27, are illustrated for a single field and have an abscissa which represents time. Any top-bottom pincushion distortion must be corrected independently by circuitry associated with the vertical output stage and vertical deflection coil.

The control windings of the saturable reactor 25 are operated from signals derived from the vertical output stage 12, and from a DC bias source 30. The sawtooth output waveform 13 from the vertical output stage 12 is coupled to a bridge rectifier 32 to produce a triangular waveform 34 having the shape of two ramps joined at their low points. One control winding of the saturable reactor is coupled to waveform 34, while a remaining control winding is coupled to a DC voltage level 36 from the DC bias source 30.

Control waveform 34 has maximum amplitudes at the beginning and end of each vertical scan and a minimum amplitude at the vertical center of each scan, with a substantially linear time variation between these points. Since a minimum amplitude control signal produces a maximum inductance in the saturable reactor 25, rather than a minimum inductance as is desired, a compensating or offset flux of constant amplitude is applied through the control winding associated with the DC bias source 30. The resultant flux produced by the DC bias level 36, when combined with the flux produced by the control waveform 34, causes the core flux to vary in a triangular manner and have a minimum at the beginning and end of the vertical scan, and a maximum at the center of the vertical scan. Due to the gradual flattening of the BH curve of the saturable reactor, a parabolic or nonlinear inductance change is experienced rather than a triangular or linear inductance change.

In FIG. 2, the correction circuit of FIG. 1 is illustrated in detail. The saturable reactor 25 is formed by a core having a center leg 50 and a pair of outer legs 52 and 54 which form a two window magnetic circuit. The core itself comprises two E-shaped core sections, 51 and 53, which are separated by an air gap illustrated at 55. A main or impedance coil 56 is wound about the center leg 50, and has its input lead coupled to stage 18 and its output lead coupled to stage 22.

A control flux component is produced by a pair of control coils 60 and 62 which are wound about the outer legs 52 and 54, respectively. The control coil 60 has one lead coupled through a line 64 to the bridge rectifier 32, and its other lead coupled through a line 66 to a lead of the coil 62, the opposite lead of which is coupled through a line 68 to the bridge rectifier 32. The coils 60 and 62 are connected in a manner to cause opposing flux to flow through the center leg 50.

A third component of flux is produced by means of a pair of bias coils 70 and 72 which are wound over windings 60 and 62, respectively. For clarity, coils 70 and 72 are indicated by dashed lines. The coil 70 has an output lead 74 which is coupled to one side of DC bias source 30 and an opposite lead 76 which is coupled to one lead of the opposite bias coil 72, whose remaining output lead 78 is coupled to the opposite side of the bias source 30. The coils 70 and 72 are oriented such that their flux components tend to cancel in the center leg 50.

The sawtooth waveform 13 produced by the conventional vertical output circuit 12 is coupled to the bridge rectifier 32, which consists of diodes 80, 81, 82 and 83 each located in a separate bridge leg or branch. A variable potentiometer 86 shunts the two opposed bridge junctions coupled between the vertical output stage 12 and the vertical deflection coil 15. A wiper 87 of the potentiometer controls the ratio of current which passes through the pincushion correction circuitry. A paralleled resistor 90 and capacitor 92 are located in series with the diode 82.

In operation, the sawtooth waveform 13 is full wave rectified to produce the triangular waveform 34, having a shape similar to a pair of mirror symmetry ramps joined at the center. Each ramp has a substantially linear time variation throughout its length. The waveform minimum which occurs at the center of the vertical scan corresponds to the point at which the sawtooth waveform 13 goes through zero. This dual triangular waveform 34 is coupled to control coils 60 and 62 to generate magnetic flux components 95 and 96 which are oppositely going in the center leg 50.

The main or center leg coil 56 has its input coupled to the horizontal output circuit, which generates a recurring sawtooth scan signal having a frequency of 15.75 kilohertz. The coil 56 produces a flux component 98 within the center leg and having a polarity which depends on the polarity of the horizontal output signal. The flux component 98 splits and flows through the pair of outer core legs in similar going directions.

The bias coils 70 and 72, wound over the control coils 60 and 62, cause flux components 100 and 102 to flow in the pair of outer legs. As will be noted, the bias flux components 100 and 102 tend to cancel in the center leg 50, and are opposite to the flux components 95 and 96 which are produced by the control coils 60 and 62. The bias flux components shift the total core flux in the manner illustrated by flux curve 110. The dashed line curve 112 represents the total flux produced by control windings 60 and 62 alone, when coupled to the diode bridge 32. Thus, the bias flux is used to offset or shift the flux curve to produce the desired reactance change in the center coil 56.

Inasmuch as the frequency of the derived vertical control waveform 34 is much lower than that of the horizontal output waveforms 20, the saturable reactor can be viewed as biased at some operating point on its BH curve by a relatively slowly varying flux component (corresponding to the vertical output waveform). About this operating point, small signal variations are produced by the flux component derived from the horizontal output waveform. The bias provided by the vertical derived signal 34 moves the operating point from zero to some point in the knee or nonlinear portion of the BH curve. When operating in the nonlinear portion or knee region of the BH curve, equal small signal variations of opposite polarities will not produce corresponding equal flux variations, as is well known. For example, when so operating in the first quadrant of the BH curve, a small current variation in the positive direction results in a smaller change in flux than a change of equal amplitude in the negative direction. Thus, the linear change in control flux creates a nonlinear, essentially parabolic variation in the permeability of the center leg core.

At such times as the current through center coil 56 is zero (corresponding to the center of the horizontal scan), flux components produced in the center leg by coils 60 and 62 and coils 70 and 72 cancel. However, when a current flows through coil 56, the resulting flux in the side legs produces an imbalance in the total flux. This imbalance results in incomplete cancellation of the flux components in the center leg of the core, which combines with the flux produced by coil 56 to determine the total flux in the center leg, and therefor the inductance exhibited by the center coil 56. Since the flux components produced by the control coils 60 and 62 varies cyclically at the vertical scan rate, the inductance of center coil 56 varies at the same rate. This produces a parabolic variation in the inductive reactive impedance of the center coil, effecting a parabolic modulation of the horizontal scanning signals as illustrated by the output signals 27.

The inductance of a coil wound about a magnetic core is proportional to the permeability of the core at any given instant. The permeability of a core is represented by the slope of the BH curve for that core, so that as the slope of the BH curve tends towards zero, the permeability and hence the inductance of a coil wound about the core decreases accordingly. The air gap 55 effects a softening or smoothing of the knee portion of the BH curve. Such softening is desirable because it prevents extremely abrupt changes in the permeability as the core flux approaches saturation, thereby allowing smooth variation in the impedance of winding 55 as a function of core flux in the region of saturation.

The flux component produced by the pairs of control and bias coils on the outer legs are essentially the same as would be produced by a single coil on each leg supplied with a triangular current waveform having a maximum at the center of the vertical scan, and a minimum at the beginning and end of the vertical scan. With the circuit illustrated in FIG. 2, the maximum flux is negative. However, if the diode bridge 32 was changed, or if a different reference direction was assumed for the current, the triangular or V-shaped current and flux waveform would have negative peaks and a zero at center of vertical scan. A positive flux bias (opposite to the illustrated flux bias) would then be required to shift the resultant flux to produce a positive peak at the center of vertical scan with zeros at the ends. Various changes of this nature may be made as desired. For some circuits, it may be desired to set the DC bias flux at a slightly greater value than the peak flux caused by the vertical V-shaped current, to thus set the total control winding flux minimum slightly off zero. The DC flux is generated so as to oppose the flux produced by the vertical control signal.

The parallel RC network comprising resistor 90 and capacitor 92 forms a lead network to compensate for distortion in the vertical output waveform which is introduced by the coils 60 and 62. This distortion, if uncorrected, would cause the sawtooth waveform to vary in an undesirable nonlinear fashion during the first half of the vertical scan. During the second half of the vertical scan, it has been found that the distortion produced by the coils 60 and 62 actually aids in reduction of side pincushion distortion. Thus, the lead network is inserted only in one of the bridge legs which conduct during the first half of the vertical scan.

The potentiometer 86 shunts the diode bridge and supplies a component of current to the vertical deflection coils 15, which component does not pass through the control windings of the saturable reactor. This current combines with the component which flows through the bridge and saturable reactor control windings to produce the total vertical deflection current. By adjusting the setting of wiper 87, the proportion of current passing through the pincushion correction circuitry can be varied to thereby effect the desired amount of variation in the impedance of winding 56. Thus, it can be seen that varying the setting of wiper 87 causes a corresponding variation in the amplitude of the parabolic envelope applied to each field of horizontal scanning signals.

As an alternate embodiment, the main winding 56 may be split and placed on the outside legs of the saturable reactor, with the control windings 60, 62 being combined and placed on the center leg. Although the fluxes would combine in a slightly different manner, the result would be substantially the same. Other changes in the correction circuit will be apparent to those skilled in the art.

By way of example only, the following component values may be used to practice the invention.

| COMPONENT | TYPE OR SIZE |
|---|---|
| Potentiometer **86** | 30 Ω |
| Resistor **90** | 5.6 Ω |
| Capacitor **92** | 220 microfarad, 5V |
| Winding **60** and **62** | 70 turns of No. 32 wire (each) |
| Windings **70** and **72** | 125 turns of No. 30 wire (each) |
| Winding **56** | 20 turns of No. 24 wire |
| Core material | Stackpole No. 24B ferrite |
| Air gap | 2.5 mils |

I claim:

1. In a television receiver including a cathode ray tube, first and second deflection windings associated with the cathode ray tube, a first deflection circuit for supplying deflection signals to the first deflection winding, and a second deflection ciruit for supplying deflection signals to the second deflection winding, a pincushion distortion correction circuit comprising:

a saturable reactor having a control winding and an impedance winding, the impedance winding being connected in circuit with the first deflection winding such that the amount of current flowing through the first delection winding is determined in part by the impedance of the impedance winding; and control circuit means including a bridge circuit coupled to the second deflection circuit for producing a triangular current waveform derived from deflection signals produced by the second deflection circuit, the control circuit means being coupled to the saturable reactor such that the application of the triangular waveform to the saturable reactor control winding causes the impedance of the impedance winding to vary nonlinearly with the triangular waveform.

2. In a television receiver including a cathode ray tube, first and second deflection windings associated with the cathode ray tube, a first deflection circuit for supplying deflection signals to the first deflection winding, and a second deflection circuit for supplying deflection signals to the second deflection winding, a pincushion distortion correction circuit comprising:

a saturable reactor having a control winding and an impedance winding, the impedance winding being connected in circuit with the first deflection winding such that the amount of current flowing through the first deflection winding is determined in part by the impedance of the impedance winding; and control circuit means for producing a triangular current waveform derived from deflection signals produced by the second deflection circuit, the control circuit means comprises a rectifier circuit which is coupled to the second deflection circuit and supplies a predetermined full wave rectified portion of the deflection signal applied thereto to the control winding of the saturable reactor to cause the impedance of the impedance winding to vary nonlinearly therewith and passes the remaining portion of the deflection signal supplied thereto to the second deflection winding.

3. The television receiver of claim 2 wherein said rectifier circuit comprises a bridge rectifier and includes shunt means for shunting a portion of the deflection current supplied thereto around the bridge circuit directly to the second deflection winding.

4. The television receiver of claim 3 wherein the shunt means is adjustable, whereby the proportion of current from the second deflection circuit which flows through the saturable reactor control winding may be varied.

5. The television receiver of claim 1 wherein said control circuit means includes means for causing the saturable reactor to operate about a nonlinear portion of its BH characteristic such that a control current which varies linearly with time causes a nonlinear time variation of the impedance presented by the impedance winding on the reactor.

6. In a television receiver including a cathode ray tube, first and second deflection windings associated with the cathode ray tube, a first deflection circuit for supplying deflection signals to the first deflection winding, and a second deflection circuit for supplying deflection signals to the second deflection winding, a pincushion distortion correction circuit comprising:

a saturable reactor having a control winding and an impedance winding, the impedance winding being connected in circuit with the first deflection winding such that the amount of current flowing through the first deflection winding is determined in part by the impedance of the impedance winding; and control circuit means for producing a triangular current waveform derived from deflection signals produced by the second deflection circuit, the control circuit means being coupled to the second deflection circuit and to the saturable reactor, and a bias winding and a DC current source connected to said winding for producing a constant flux bias for the saturable reactor to cause the saturable reactor to operate about a nonlinear portion of its BH characteristic such that a control current which varies linearly with application of the triangular waveform causes a nonlinear time variation of the impedance presented by the impedance winding on the reactor.

7. The television receiver of claim 6 wherein the saturable reactor comprises a two window core, having a pair of outer legs and an inner leg, and the control winding comprises two series connected windings each wound about one of the outer core legs, and wherein the impedance winding comprises a single winding wound about the inner core leg.

8. The television receiver of claim 7 wherein a lead network is interposed in a portion of the bridge rectifier which passes current during the beginning portion of scan.

9. The television receiver of claim 1 wherein the first deflection winding comprises a horizontal winding, the first deflection circuit comprises a horizontal deflection circuit, the second deflection winding comprises a vertical winding, and the second deflection circuit comprises a vertical deflection circuit.

* * * * *